Patented Mar. 13, 1928.

1,662,401

UNITED STATES PATENT OFFICE.

JOHN HOWARD SASSEEN, OF NEW BRAUNFELS, TEXAS.

PROCESS FOR PRESERVING RICE POLISH.

No Drawing.  Application filed February 1, 1927.  Serial No. 165,241.

This invention relates to a process for preserving rice polish and it is primarily an object of the invention to treat this well known by-product incident to the treatment of rice whereby the same is rendered fit for human consumption.

It is also an object of the invention to provide a process of this kind wherein the rice polish is treated in a manner permitting heat to penetrate the germ cells of the material, resulting in a mixing of the oils or fats with the natural sodium and silicon contents thereby sterilizing and preserving such material in its entirety along with the iron, calcium and magnesium contained in the rice polish.

Another object of the invention is to provide a process of this kind wherein the rice polish during its period of heating is subjected to agitation causing the natural oil or fat, when melted from its cuticle and cells, to encapsulate all parts and organic salts of the rice polish, giving a uniform distribution and sterilization of all the ingredients contained in the rice polish, resulting in a nutritious and wholesome food for human consumption.

As is well known, rice polish is a product derived from the whole natural kernel of rice and it is the purpose of the process as herein disclosed to preserve the particular coating lying next to the starch center of the kernel and which coating is removed in the form of rice polish. In the skillful milling process of rice kernels this particular coating, which also may be termed germ or cuticle, lying next to the rice kernel is polished off by centrifugal leather drums resulting in this by-product being given the name or term "rice polish".

It is recognized that approximately eighty-five percent of the vitamine and mineral contents of the natural kernel of the rice is removed in the polishing process. This removal of the rice polish, along with the outer bran germs or cuticles, is necessary in order to prevent the rice from becoming rancid and weevil infected so that the final starch center will be preserved for market consumption.

Rice grains when harvested and threshed are delivered to the mill in their entirety and which are called in their "paddy" form. The mill first removes the outer hull or husk, then the bran tissues and then the cuticle lying in the very thinnest form surrounding the starch center of the kernel is polished off.

This by-product of rice polish contains the main and principal food values of the entire rice kernels, namely; organics, salts, fats, sodium, iron, calcium, silicon, magnesium and phosphorus. With the preservation of the rice polish these elements can be utilized for human consumption. Prior to my process this by-product has been discarded by the mill as not fit for human food.

The rice polish after being first removed from the kernels is subjected to the action of a centrifugal reel, well known in the rice industry, equipped with a silk cloth not thinner than a No. 12 mesh. This action within the centrifugal reel separates from the rice polish all foreign particles, such as broken hulls, bran, small chips of broken kernels and other foreign sediment, resulting in the rice polish being smooth and clean.

After this separating treatment or cleansing of the rice polish it is subjected to the action of a horizontal drum like sterilizer, also of a type well known in the rice industry, and which operates effectively to sterilize the polish without burning or clogging the same.

During the period of sterilization, the rice polish is maintained in motion or agitation, thus giving each and every particle of the polish uniform heat, said heat reaching a temperature of approximately 180° F. which is maintained for a period of substantially ten minutes. After this sterilizing treatment, the polish, while warm, is sealed in airtight containers so that no foreign particles or contamination will come in contact therewith. While in these airtight containers the rice polish will keep indefinitely, retaining its full food value and properties.

The rice polish contains main food elements with its fat or oil content of over seven pounds to a hundred pounds of rice polish.

It is to be understood that after the polish is placed in the sterilizer the temperature is gradually increased to approximately 180° and which approximate amount of temperature is maintained for substantially a period of ten minutes before the sterilized polish is sealed within the containers.

The heat during the sterilization of the rice polish penetrates the germ cells containing the oils or fats causing the same to become mixed with the natural sodium and silicon contents, thereby sterilizing and preserving the same along with the iron, calcium and magnesium in the polish all of which being retained uniformly throughout the product.

Immediately upon removal of the rice product from the action of the heat and sterilization, the product becomes dry and flaky. The constant movement or agitation of the rice polish during the period of sterilization allows the natural oils or fats when melted from its cuticle and cells to encapsulate all parts and organic salts of the polish, resulting in a uniform distribution and sterilization of all the ingredients contained in the polish and thereby producing a nutritious and wholesome food for human consumption.

I claim:—

A process for preserving rice polish comprising the subjecting of such polish to the action of heat of a temperature and for a period of time sufficient to cause the oil and fat within the polish to melt and encapsulate the other ingredients contained within the polish.

In testimony whereof I hereunto affix my signature.

JOHN HOWARD SASSEEN.